United States Patent Office 3,065,110
Patented Nov. 20, 1962

3,065,110
PROCESS FOR PREVENTING ELECTROSTATIC CHARGES ON SYNTHETIC HIGH POLYMERS
Walter Hagge, Leverkusen, Heinrich Krause, Koln-Stammheim, Matthieu Quaedvlieg, Leverkusen, Anton Schlachter, Lochham, and Karl Schönol, Leverkusen, Germany, assignors to Farbenfabriken Bayer Aktiengesellschaft, Leverkusen, Germany, a corporation of Germany
No Drawing. Filed Nov. 8, 1960, Ser. No. 67,892
Claims priority, application Germany Nov. 24, 1959
4 Claims. (Cl. 117—138.8)

The present invention relates to the prevention of electrostatic charges on synthetic high polymers; more particularly it concerns a process for preventing electrostatic charges on synthetic high polymers which consists in treating the synthetic high polymers with salts having the general formula

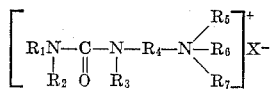

wherein $R_1$ denotes an alkyl residue containing at least 10 carbon atoms, $R_2$ and $R_3$ are hydrogen and/or the same or different alkyl or aryl residues, $R_4$ is an aliphatic or aromatic residue, and $R_5$, $R_6$, as well as $R_7$ are the same or different alkyl, hydroxyalkyl, or aralkyl residues, whereas X is an acid residue.

The salts to be used in accordance with the invention are obtainable by various methods, e.g. according to British patent specification No. 500,153 in that aliphatic isocyanates containing at least 10 carbon atoms in the alkyl residue, e.g., dodecyl isocyanate, tetradecyl isocyanate, and octadecyl isocyanate, are reacted with bivalent aliphatic or aromatic amines which contain a primary or secondary amino group and a tertiary amino group—e.g. with 3-dimethylamino-1-aminopropane or p-aminodimethylaniline—and the reaction product is treated with a quaternizing agent, e.g. with dimethyl sulfate, diethyl sulfate, benzyl chloride, or 2-bromoethanol.

The treatment of the synthetic high polymers, e.g. fibres, filaments, or powders from polyamides, polyesters, polyacrylonitriles, or polyvinyl chlorides, with the salts of the general formula indicated above is carried out in a manner known as such, e.g. by spraying or impregnating the materials to be treated with solutions of the salts in water or organic solvents.

The salts of the present invention distinguish themselves from previously known agents which have already been proposed for the prevention of electrostatic charges on synthetic high polymers by a surprisingly higher effect.

The following examples serve to illustrate the invention without, however, limiting the scope thereof.

*Example 1*

A fabric of polyacrylonitrile threads is treated at 40° C. at a goods-to-liquor ratio of 1:30 with an aqueous solution which contains, per litre, 0.02 g. of N-tetradecyl-N'-(3-dimethylamino)-propylurea quaternized with dimethyl sulfate. The fabric is then centrifuged and dried. The surface resistance of the fabric at 65% relative air humidity has then decreased from $4 \times 10^{12}$ Ω to $1 \times 10^9$ Ω.

*Example 2*

A fabric of polyester fibres is treated, as described in Example 1, with a solution which contains, per litre, 0.03 g. of N-octadecyl-N'-(3-dimethylamino)-propylurea quaternized with dimethyl sulfate. The surface resistance of the fabric at 65% relative air humidity has then decreased from $2 \times 10^{13}$ Ω to $5 \times 10^8$ Ω.

*Example 3*

A fabric of polyvinyl chloride is treated, as described in Example 1, with a solution which contains, per litre, 0.05 g. of N-octadecyl-N'-(3-dimethylamino)-propylurea quaternized with 2-bromethanol. The surface resistance of the fabric at 65% relative air humidity has then decreased from $5.10^{12}$ Ω to $3.10^9$ Ω.

We claim:
1. A process for inhibiting the formation of electrostatic charges on synthetic high polymers comprising treating a synthetic high polymer with a salt having the general formula

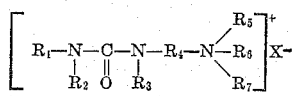

wherein $R_1$ denotes an aliphatic residue containing 12-18 carbon atoms, $R_2$ and $R_3$ are H atoms, $R_4$ is $$-CH_2-CH_2-CH_2-$$

and $R_5$, $R_6$, and $R_7$ are radicals selected from the group consisting of alkyl, hydroxyalkyl, and aralkyl residues, and X denotes an acid residue.

2. A process according to claim 1 wherein the salt is N-tetradecyl-N'-(3 - dimethylamino) - propylurea quaternized with dimethyl sulfate.

3. A process according to claim 1 wherein the salt is N-octadecyl-N'-(3 - dimethylamino) - propylurea quaternized with dimethyl sulfate.

4. A process according to claim 1 wherein the salt is N-octadecyl-N'-(3 - dimethylamino) - propylurea quaternized with 2-bromethanol.

References Cited in the file of this patent
UNITED STATES PATENTS 2,897,170   Gruber _____ July 28, 1959

FOREIGN PATENTS 500,153   Great Britain _____ Feb. 3, 1939